United States Patent
Wang et al.

(10) Patent No.: US 12,266,178 B2
(45) Date of Patent: Apr. 1, 2025

(54) VIDEO COVER DETERMINING METHOD AND DEVICE, AND STORAGE MEDIUM

(71) Applicant: BEIJING XIAOMI MOBILE SOFTWARE CO., LTD., Beijing (CN)

(72) Inventors: Mingxi Wang, Beijing (CN); Rongxin Gao, Beijing (CN); Ning Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 953 days.

(21) Appl. No.: 17/334,971

(22) Filed: May 31, 2021

(65) Prior Publication Data
US 2022/0147741 A1 May 12, 2022

(30) Foreign Application Priority Data
Nov. 6, 2020 (CN) .......................... 202011230221.X (51) Int. Cl.
*G06V 20/40* (2022.01)
*G06F 16/738* (2019.01)
*G06F 18/22* (2023.01)

(52) U.S. Cl.
CPC ............ *G06V 20/46* (2022.01); *G06F 16/739* (2019.01); *G06F 18/22* (2023.01)

(58) Field of Classification Search
None
See application file for complete search history.

(56) References Cited

U.S. PATENT DOCUMENTS

| 2006/0026524 A1 | 2/2006 | Ma et al. |
| 2012/0054615 A1* | 3/2012 | Lin ................ H04N 21/234363 |
| | | 715/719 |

(Continued)

FOREIGN PATENT DOCUMENTS

| CN | 108650524 A | 10/2018 |
| CN | 109165301 A | 1/2019 |

(Continued)

OTHER PUBLICATIONS

First Office Action of the Chinese Application No. 202011230221.X, issued on Apr. 2, 2022, with English translation, (18p).

(Continued)

*Primary Examiner* — John B Strege
*Assistant Examiner* — Elisa M Rice
(74) *Attorney, Agent, or Firm* — Arch & Lake LLP; Hao Tan; Shen Wang (57) ABSTRACT

Methods, devices, and a non-transitory computer-readable storage medium are provided for determining a video cover image. The method includes: obtaining a candidate image set containing a plurality of image frames to be processed by determining the plurality of image frames to be processed from a video to be processed, each of the plurality of image frames to be processed containing at least one target object; obtaining a target score of each of the plurality of image frames to be processed by inputting the plurality of image frames to be processed in the candidate image set into a scoring network; and sorting the target scores of the plurality of image frames to be processed according to a set order to obtain a sorting result, and determining a video cover image of the video to be processed from the plurality of image frames to be processed according to the sorting result.

12 Claims, 5 Drawing Sheets

---

Obtaining a candidate image set containing M image frames to be processed by determining the M image frames to be processed from a video to be processed, each of the image frames to be processed containing at least one target object, M being a positive integer — 101

Obtaining a target score of each of the image frames to be processed by inputting the M image frames to be processed in the candidate image set into a scoring network — 102

Sorting the target scores of the image frames to be processed according to a set order, and determining a cover image of the video to be processed from the M image frames to be processed according to a result of the sequencing — 103

(56) References Cited

U.S. PATENT DOCUMENTS

2014/0099034 A1* 4/2014 Rafati .................. G06V 20/47
  382/209
2017/0053170 A1 2/2017 Rafati et al.
2018/0336419 A1 11/2018 Rafati et al.

FOREIGN PATENT DOCUMENTS

| CN | 110399848 | A | 11/2019 |
| CN | 111464833 | A | 7/2020 |
| CN | 111491209 | A | 8/2020 |
| EP | 1624391 | A2 | 2/2006 |
| WO | 2020040679 | A1 | 2/2020 |

OTHER PUBLICATIONS

Extended European Search Report in the European Application No. 21176817.1, mailed on Nov. 19, 2021, (8p).

* cited by examiner

VIDEO COVER DETERMINING METHOD AND DEVICE, AND STORAGE MEDIUM

CROSS-REFERENCE TO RELATED APPLICATION

This application is based upon and claims priority to Chinese Patent Application No. 202011230221.X, filed on Nov. 6, 2020, the content of which is hereby incorporated by reference in its entirety for all purposes.

BACKGROUND

There are lots of contents about movies and TV plays in video Applications (Apps), such as movie commentary, and highlight clips of movies and TV plays. As a form of rapidly displaying video content, a video cover enables users to judge whether they will be interested in the video content in advance before browsing the video. A good video cover will undoubtedly improve the success rate of video recommendation.

In the related art, a cover of video data may be set manually, for example, a poster picture or a certain picture in the content of a certain movie may be used as a cover of the movie in a video website. In addition, a person face pattern in the video may be used as a cover of video data through some technical means, for example, an image frame containing the person face pattern in the video is selected as a video cover matched with a scene to be displayed, and so on. However, the selection accuracy of the existing cover selection method is poor, and time consumed for selecting the cover is long.

SUMMARY

The disclosure relates to the technical field of imaging processing, and more particularly, to a video cover determining method and device, and a storage medium.

According to a first aspect of the disclosure, a video cover determining method is provided. The method may include obtaining a candidate image set containing a plurality of image frames to be processed by determining the plurality of image frames to be processed from a video to be processed, each of the plurality of image frames to be processed containing at least one target object. Additionally, the method may include obtaining a target score of each of the plurality of image frames to be processed by inputting the plurality of image frames to be processed in the candidate image set into a scoring network. Further, the method may include sorting a plurality of target scores of the image frames to be processed according to a set order to obtain a sorting result, and determining a cover image of the video to be processed from the plurality of image frames to be processed according to the sorting result.

According to a second aspect of the disclosure, a video cover determining device is provided. The device may include a processor and a memory configured to store instructions executable by the processor. The processor is configured to execute the instructions to obtain a candidate image set containing a plurality of image frames to be processed by determining the plurality of image frames to be processed from a video to be processed, each of the image frames to be processed containing at least one target object. The processor is further configured to obtain a target score of each of the image frames to be processed by inputting the plurality of image frames to be processed in the candidate image set into a scoring network and sort a plurality of target scores of the image frames to be processed according to a set order to obtain a sorting result, and determine a cover image of the video to be processed from the plurality of image frames to be processed according to the sorting result.

According to a third aspect of the disclosure, a non-transitory computer-readable storage medium is provided. When instructions in the storage medium are executed by a processor of a video cover determining device, the device may be enabled to perform steps in the video cover determining method provided in the first aspect described above.

It is to be understood that the above general descriptions and detailed descriptions below are only explanatory and not intended to limit the disclosure.

BRIEF DESCRIPTION OF THE DRAWINGS

The accompanying drawings, which are incorporated in and constitute a part of this specification, illustrate embodiments consistent with the disclosure and, together with the specification, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of devices and methods consistent with aspects related to the disclosure as recited in the appended claims.

Figure 1:
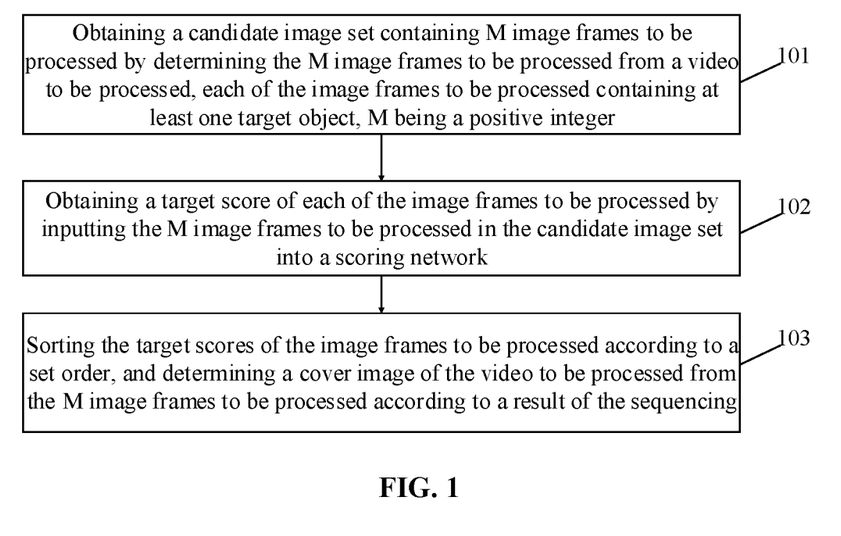
FIG. 1 is a first flowchart illustrating a video cover determining method according to at least one example of the disclosure.

FIG. 1 is a first flowchart illustrating a video cover determining method according to at least one example of the disclosure. The method may be applied to a scene for selecting a cover of video data. The video data may be videos in an album in a terminal device, and may also be real-time videos shot by using interactive applications, such as real-time videos shot by using a WeChat application or real-time videos shot by using a MicroBlog application. As shown in FIG. 1, the video cover determining method includes the following steps.

In step 101, M image frames to be processed are determined from a video to be processed to obtain a candidate image set containing the M image frames to be processed. Each of the image frames to be processed contains at least one target object. M is a positive integer. For example, M may be an integer greater than 1.

In step 102, the M image frames to be processed in the candidate image set are input into a scoring network to obtain a target score of each of the image frames to be processed.

In step 103, the target scores of the image frames to be processed are sequenced according to a set order, and a cover image of the video to be processed is determined from the M image frames to be processed according to a result of the sequencing.

The video cover determining method in the embodiments of the disclosure may be applied to a terminal device, and the terminal device selects a cover image for a video to be processed by executing the video cover determining method. The terminal device includes a wearable electronic device or a mobile terminal. The mobile terminal includes a mobile phone, a laptop or a tablet computer, and the wearable electronic device includes a smart watch or a smart bracelet, which are not limited in the embodiments of the disclosure.

In some embodiments, the above video cover determining method may also be applied to a server that establishes a communication connection with the terminal device. The server may send a selected target image frame to the terminal device so that the terminal device can use the target image frame as a cover image of the video to be processed.

In some embodiments, the target object may be a person image contained in an image frame to be processed, for example, an image of a star appearing in a movie. For example, a video to be processed is movie A, and then the target object may be an image of star B that plays a role in movie A. In the process of implementation, M image frames to be processed containing star B can be determined from movie A.

In the embodiments of the disclosure, after an image frame containing a target object is determined, M image frames to be processed determined from a video to be processed may be input into a scoring network to obtain an overall score, i.e., a target score, for each image to be processed. That is, after M image frames to be processed in the embodiments of the disclosure are input into the scoring network, M target scores can be output. In some embodiments, the scoring network may be pre-trained based on a mathematical model for scoring each image frame to be processed. For example, the scoring network may be obtained based on neural network training.

In some embodiments, the target score of the image frame to be processed is positively correlated to the probability of determining the image frame to be processed as a cover image. That is, if the target score of the image frame to be processed is higher, the probability of determining the image frame to be processed as a cover image is higher. If the target score of the image frame to be processed is lower, the probability of determining the image frame to be processed as a cover image is smaller.

In the embodiments of the disclosure, after the M target scores of the M image frames to be processed are obtained, the M target scores may be sequenced or sorted according to a descending sequence, and an image frame to be processed with the largest target score is determined as a cover image of the video to be processed.

In some embodiments, K image frames to be processed with the largest target score may also be determined as a cover image set of the video to be processed, i.e., a cover image set is generated based on top K image frames to be processed. In the process of implementation, each cover image in the cover image set may be displayed in the form of a slide based on a preset play time interval. Therefore, the diversification of the display mode of the cover image can be improved, and the use experience of users can be further improved.

In other embodiments, the M target scores may also be sequenced in an ascending sequence, which will not be specifically limited herein.

In the embodiments of the disclosure, M image frames to be processed are determined from a video to be processed, and a candidate image set is formed based on the M image frames to be processed. In the process of selecting a video cover, the M image frames to be processed can be scored based on a scoring network to obtain a target score of each of the image frames to be processed, the target scores are sequenced or sorted according to a set order, and then a cover image containing a target object is determined according to a result of the sequencing or sorting. Compared with the related art in which the cover image of the video to be processed is determined manually, automatic selection of the cover image can be realized. The selection accuracy of the video cover can be improved, and time consumed for determining the video cover can also be saved.

In some embodiments, obtaining the target score of each of the image frames to be processed by inputting the M image frames to be processed in the candidate image set into the scoring network includes:

obtaining an image feature score of each of the image frames to be processed by inputting the image frame to be processed into an image scoring network;

obtaining an object feature score of each of the image frames to be processed by inputting the image frame to be processed into an object scoring network;

obtaining an aesthetic feature score of each of the image frames to be processed by inputting the image frame to be processed into an aesthetic scoring network; and obtaining the target score of each of the image frames to be processed based on the image feature score, the object feature score and the aesthetic feature score.

Here, the image scoring network may be pre-trained based on a mathematical model for scoring image features of each image frame to be processed to obtain image feature scores of the image frames to be processed. For example, the image scoring network may be obtained based on neural network training. The image feature includes at least one of the following: a black edge of an image frame to be processed; brightness of an image frame to be processed; and definition of an image frame to be processed. The black edge refers to a black part except picture content in an image frame to be processed, and the black edge of the image frame to be processed may be located: above the picture content, below the picture content, on the left of the picture content, and/or on the right of the picture content.

In some embodiments, inputting each of the image frames to be processed into the image scoring network to obtain the image feature score of each of the image frames to be processed includes:

inputting each of the image frames to be processed into the image scoring network to obtain a black edge size of each of the image frames to be processed, a brightness score of each of the image frames to be processed, and a definition score of each of the image frames to be processed; and obtaining the image feature score of each of the image frames to be processed based on the black edge size of each of the image frames to be processed, the brightness score of each of the image frames to be processed, and the definition score of each of the image frames to be processed.

In some embodiments, obtaining the image feature score of each of the image frames to be processed based on the black edge size of each of the image frames to be processed, the brightness score of each of the image frames to be processed, and the definition score of each of the image frames to be processed includes:

weighting the black edge size of each of the image frames to be processed, the brightness score of each of the image frames to be processed, and the definition score of each of the image frames to be processed; and summing the weighted black edge size of a picture where each of the image frames to be processed is located, brightness score of each of the image frames to be processed, and definition score of each of the image frames to be processed to obtain the image feature score of each of the image frames to be processed.

For example, the black edge size of each of the image frames to be processed may be weighted based on a first weight value, the brightness score of each of the image frames to be processed may be weighted based on a second weight value, and the definition score of each of the image frames to be processed may be weighted based on a third weight value.

In some embodiments, a calculation formula of the image feature score is as follows:

$$\text{score1} = \begin{Bmatrix} 0, & \text{pure} - \text{color} = 0 \\ \text{black} - \text{edge} \times 0.1 + \text{brightness} \times 0.2 + \text{blur1} \times 0.7 \end{Bmatrix}. \quad (1)$$

In formula (1), score1 represents an image feature score; black-edge represents a black edge size of an image frame to be processed; brightness represents a brightness score of an image frame to be processed; blur1 represents a definition score of an image frame to be processed; pure-color represents the color saturation of an image frame to be processed, and in the case of pure-color=0, score1=0; 0.1 represents a weight of black-edge, i.e. a first weight value; 0.2 represents a weight of brightness, i.e. a second weight value; 0.7 represents a weight of blur1, i.e. a third weight value.

In the embodiments of the disclosure, the black edge size, the brightness score and the definition score of each of the image frames to be processed can be weighted, and the weighted black edge size, brightness score and definition score are summed to obtain the image feature score of each of the image frames to be processed. In the process of implementation, a weight coefficient of each parameter can be adjusted as required, so that the proportion of each parameter in the image feature score is adjusted, and the flexibility of implementing the video cover determining method is further improved.

In some embodiments, an object scoring network may be pre-trained based on a mathematical model for scoring each target object in each image frame to be processed to obtain an object feature score. For example, the object scoring network may be obtained based on neural network training.

For example, the target object is a person image. The object feature includes at least one of the following: the number of person images, the location of a person image in an image frame to be processed, the size of a person image, the definition of a person image, an eye state of a person in a person image, the expression of a person in a person image, and the pose of a person in a person image.

In some embodiments, inputting each of the image frames to be processed into the object scoring network to obtain the object feature score of each of the image frames to be processed includes:

inputting each of the image frames to be processed into the object scoring network to obtain the number of person images in each of the image frames to be processed, the location of a person image in an image frame to be processed, the size of a person image, a definition score of a person image, an eye state score of a person in a person image, an expression score of a person in a person image, and a pose score of a person in a person image; and obtaining the object feature score of each image frame to be processed based on the number of person images in each of the image frames to be processed, a location score of a person image in an image frame to be processed, the size of a person image, a definition score of a person image, an eye state score of a person in a person image, an expression score of a person in a person image, and a pose score of a person in a person image.

For example, in the case where the number of person images in an image frame to be processed is less than a first number threshold or the number of person images in the image frame to be processed is greater than or equal to a second number threshold, it may be determined that the object feature score of the image frame to be processed is 0. The first number threshold and the second number threshold may be set as required. For example, the first number threshold may be 1, the second number threshold may be 5, etc.

In the case where the number of target objects in the image frame to be processed is too small, the highlights in the video to be processed cannot be obviously displayed, and in the case where the number of target objects is too large, the emphasis in the video to be processed cannot be obviously highlighted. If the image frame to be processed with too few or too many target objects is determined as a cover image of the video to be processed, the finally selected cover image may show poor content.

In the embodiments of the disclosure, by determining an object feature score of an image frame to be processed in which the number of person images is less than the first number threshold or greater than or equal to the second number threshold as 0, the possibility that the image frame to be processed is selected as a cover image can be reduced. In the disclosure, by limiting the number of the target objects in the finally selected cover image within a set range, i.e., enabling the number of the target objects in the cover image to be greater than or equal to the first number threshold and less than the second number threshold, the number of the target objects in the finally selected cover image can be reasonable.

For another example, the location score of a person image in an image frame to be processed and the size of the person image may be summed, and whether an obtained sum value is less than a set threshold or not may be determined. If the sum value is less than the set threshold, it may be determined that the object feature score of the image frame to be processed is 0. The set threshold may be set as required. For example, the set threshold may be 0.2, etc.

In the case where the location of a target object in an image frame to be processed is not excellent or the size is small, the effect of a presented person image is not good, and the person image needs to serve as the core content of a cover image, the finally selected cover image may show poor content.

In the embodiments of the disclosure, by determining the object feature score of an image frame to be processed in which the sum of the location score and the size of the person image is less than the set threshold as 0, the possibility that the image frame to be processed is selected as a cover image can be reduced, and the display effect of a target object in the finally selected cover image can be better.

For another example, when it is determined that the number of person images in an image frame to be processed is within a set range (greater than the first number threshold and less than the second number threshold) and the sum value of a location score of a person image in an image frame to be processed and the size of a person image is greater than or equal to a set threshold, the object feature score of each image frame to be processed may be determined based on a definition score of a person image in each image frame to be processed, an eye state score of a person in a person image, an expression score of a person in a person image, and a pose score of a person in a person image.

In some embodiments, obtaining the object feature score of each image frame to be processed based on a definition score of a person image in each image frame to be processed, an eye state score of a person in a person image, an expression score of a person in a person image, and a pose score of a person in a person image includes:

weighting a definition score of a person image in each of the image frames to be processed, an eye state score of a person in a person image, an expression score of a person in a person image, and a pose score of a person in a person image; and summing the weighted definition score of a person image, eye state score of a person in a person image, expression score of a person in a person image, and pose score of a person in a person image to obtain the object feature score of each image frame to be processed. In some embodiments, the pose of a person in a person image includes at least: a facial pose of a person.

For example, the definition score of each person image may be weighted based on a fourth weight value, the expression score of a person in each person image may be weighted based on a fifth weight value, the eye state score of a person in each person image may be weighted based on a sixth weight value, and the pose score of a person in each person image may be weighted based on a seventh weight value.

In some embodiments, a calculation formula of the object feature score is as follows:

$$score2 = \begin{cases} 0, & number < 1 || number \geq 5 \\ 0 & \frac{location + size}{2} < 0.1 \\ blur2 \times 0.3 + smile \times 0.1 + eye \times 0.4 + pose \times 0.2 \end{cases} \quad (2)$$

In formula (2), score2 represents an object feature score; number represents the number of person images; location represents a location score of a person image in an image frame to be processed; size represents the size of a person image; blur2 represents a definition score of a person image; smile represents an expression score of a person in a person image; eye represents an eye state score of a person in a person image; pose represents a pose score of a person in a person image; 0.3 represents a weight of blur2, i.e. a fourth weight value; 0.1 represents a weight of smile, i.e. a fifth weight value; 0.4 represents a weight of eye, i.e. a sixth weight value; 0.2 represents a weight of pose, i.e. a seventh weight value.

In some embodiments, a calculation formula of the pose score of a person in a person image is as follows:

$$pose = \frac{\left(1 - \frac{|yaw|}{90}\right) + \left(1 - \frac{|pitch|}{90}\right) + \left(1 - \frac{|roll|}{90}\right)}{3}. \quad (3)$$

In formula (3), pose represents a pose score of a person in a person image; yaw represents a yaw angle; pitch represents a pitch angle; and roll represents a roll angle.

Here, the aesthetic scoring network may be pre-trained based on a mathematical model for scoring aesthetic features of each image frame to be processed to obtain aesthetic feature scores of the image frames to be processed. For example, the aesthetic scoring network may be obtained based on neural network training. The aesthetic feature includes at least one of the following: composition of an image frame to be processed; and color richness of an image frame to be processed.

In some embodiments, inputting each of the image frames to be processed into the aesthetic scoring network to obtain the aesthetic feature score of each of the image frames to be processed includes:

inputting each of the image frames to be processed into the aesthetic scoring network to obtain a composition score of each of the image frames to be processed and a color richness score of each image frame to be processed; and obtaining the aesthetic feature score of each of the image frames to be processed based on the composition score of each of the image frames to be processed and the color richness score of each image frame to be processed.

In some embodiments, obtaining the aesthetic feature score of each of the image frames to be processed based on the composition score of each of the image frames to be processed and the color richness score of each image frame to be processed includes:

weighting the composition score of each of the image frames to be processed and the color richness score of each image frame to be processed; and summing the weighted composition score and color richness score of each image frame to be processed to obtain the aesthetic feature score of each of the image frames to be processed.

For example, the composition score of each of the image frames to be processed may be weighted based on an eighth weight value, and the color richness score of each image frame to be processed may be weighted based on a ninth weight value.

In some embodiments, a calculation formula of the aesthetic feature score is as follows:

$$score3 = composition \times 0.6 + color \times 0.4 \quad (4).$$

In formula (4), score3 represents an aesthetic feature score; composition represents a composition score of an image frame to be processed; color represents a color richness score of an image frame to be processed; 0.6 represents a weight of composition, i.e. an eighth weight value; 0.4 represents a weight of color, i.e. a ninth weight value.

In the embodiments of the disclosure, image frames to be processed can be respectively input into different types of scoring networks, i.e., the image frames to be processed are respectively input into an image scoring network, an object scoring network and an aesthetic scoring network, and a target score is obtained through scores output by the scoring networks. Therefore, information contained in the obtained target score can be more comprehensive, high-quality image frames to be processed can be determined, and the visual effect of a selected cover image can be improved.

In some embodiments, obtaining the target score of each of the image frames to be processed based on the image feature score, the object feature score and the aesthetic feature score includes:

weighting the image feature score, the object feature score and the aesthetic feature score of each of the image frames to be processed, respectively; and summing the weighted image feature score, weighted object feature score and weighted aesthetic feature score to obtain the target score of each of the image frames to be processed.

For example, the image feature score of each image frame to be processed may be weighted based on a first weight value, the object feature score of each image frame to be processed may be weighted based on a second weight value, and the aesthetic feature score of each image frame to be processed may be weighted based on a third weight value.

In some embodiments, a calculation formula of the target score is as follows:

$$\text{score}=w_1\text{score1}+w_2\text{score2}+w_3\text{score3} \qquad (5).$$

In formula (5), score represents a target score; score1 represents an image feature score; $w_1$ represents a weight of score1, i.e. a first target weight value; score2 represents an object feature score; $w_2$ represents a weight of score2, i.e. a second target weight value; score3 represents an aesthetic feature score; and $w_3$ represents a weight of score3, i.e. a third target weight value.

In the embodiments of the disclosure, the image feature score, the object feature score and the aesthetic feature score of each image frame to be processed can be weighted, and the weighted image feature score, weighted object feature score and weighted aesthetic feature score are summed to obtain the target score of each image frame to be processed. In the process of implementation, a weight value of each score can be adjusted as required, so that the proportion of each score in the target score is adjusted, and the flexibility of implementing the video cover determining method is further improved.

In some embodiments, the method may further include:

obtaining N image frames by performing frame extraction on the video to be processed according to a set time interval.

Determining the M image frames to be processed from the video to be processed includes:

determining the M image frames to be processed containing the target object from the N image frames, N being a positive integer greater than or equal to M.

In the embodiments of the disclosure, frame extraction may be performed on the video to be processed according to a set time interval to obtain N image frames. The set time interval may be set according to actual requirements, and the set time interval may be set to 1 second or 2 seconds and is not limited in the embodiments of the disclosure.

In the process of acquiring an image frame, the number N of image frames may be determined according to a quotient between a video duration and the set time interval. For example, the video duration is 60 seconds, the set time interval is 1 second, and the number N of the corresponding extracted image frames is 60.

Here, after obtaining the N image frames, M image frames to be processed containing a target object may be determined from the N image frames based on an image recognition technology. In the embodiments of the disclosure, before determining an image frame to be processed from a video to be processed, frame extraction may be performed on the video to be processed to obtain N image frames, and then an image frame to be processed containing a target object is determined from the N image frames. Compared with image recognition of all the image frames in the video to be processed, the technical solution in the disclosure can reduce the workload of image processing, improve the speed and efficiency of image processing, and further improve the efficiency of determining a cover image.

In some embodiments, determining the M image frames to be processed containing the target object from the N image frames includes:

extracting image frames, which are not matched with image frames to be filtered contained in a filtering rule, from the M image frames to be processed by performing matching based on the filtering rule according to a filtering model.

Obtaining the target score of each of the image frames to be processed by inputting the M image frames to be processed in the candidate image set into the scoring network includes:

obtaining the target score of each of the image frames to be processed which are not matched with the image frames to be filtered contained in a filtering rule and extracted from the M image frames to be processed by inputting the image frame into the scoring network.

Here, the filtering model may be pre-trained based on a mathematical model for filtering each image frame. For example, the filtering model may be obtained based on neural network training. In the embodiments of the disclosure, the image content contained in an image frame to be processed may be matched with the image content of an image frame to be filtered, when the image frame to be processed contains the image content of a preset image frame to be filtered, the image frame to be processed is determined to be matched with the preset image frame to be filtered, and the image frame to be processed may be filtered out. The image content of the preset image frame to be filtered contained in the filtering rule may be junk image content containing preset junk words and/or junk pictures.

For example, in the process of implementation, the image content in an image frame to be processed may be matched with junk words and/or junk pictures contained in the junk image content, when the image frame to be processed contains the junk words and/or the junk pictures, the image frame to be processed is determined to be matched with a preset image frame to be filtered, and the image frame to be processed may be filtered out. In the disclosure, by filtering out the junk image content containing preset junk words and/or junk pictures, an image frame to be processed meeting conditions can be accurately determined, and the accuracy of the determined cover image is further improved.

Here, the image frame to be processed which is matched with the image frame to be filtered set based on the filtering rule may be filtered out through the filtering rule, and the image frame to be processed which is not matched with the image frame to be filtered set based on the filtering rule may be extracted. The image content contained in the image frame to be filtered set based on the filtering rule may be meaningless image content, for example, image content related to advertisements, pornography, affairs, violence, and/or terrorism, image content with a word ratio larger than an image ratio, etc.

In the embodiments of the disclosure, an image frame which is matched with an image frame to be filtered contained in a filtering rule may be filtered out based on a filtering model, and an image frame which is not matched with the image frame to be filtered contained in the filtering rule may be extracted as an image frame to be processed. The possibility of selecting an unhealthy image frame or an image frame causing discomfort to a user as a cover image can be reduced, so that the use experience of the user is improved.

Figure 2:
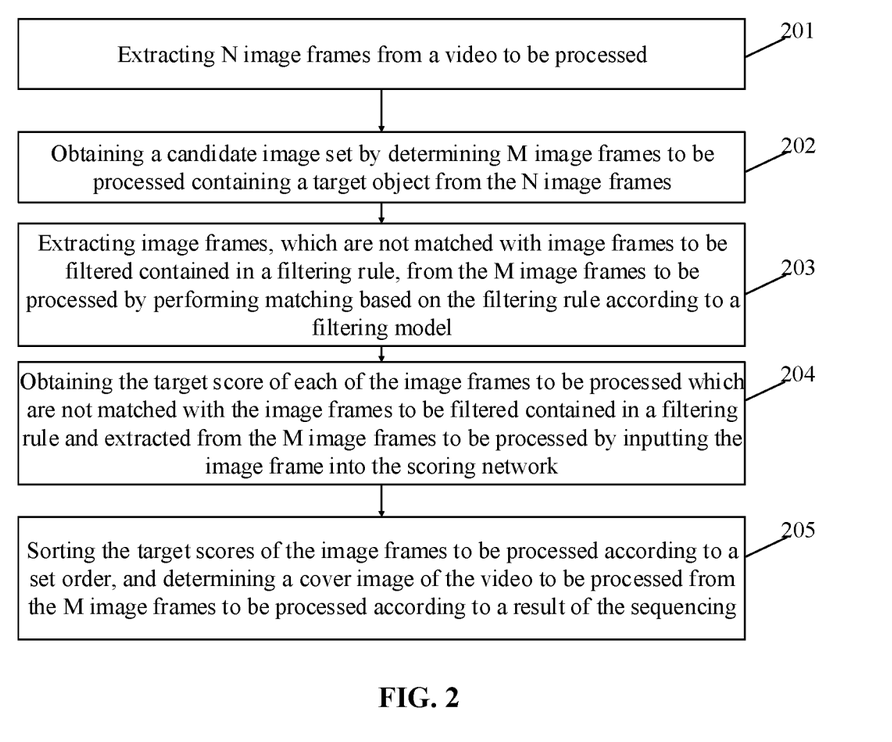
FIG. 2 is a second flowchart illustrating a video cover determining method according to at least one example of the disclosure.

FIG. 2 is a second flowchart illustrating a video cover determining method according to at least one example of the disclosure. As shown in FIG. 2, the video cover determining method includes the following steps.

In step 201, N image frames are extracted from a video to be processed.

In the embodiments of the disclosure, frame extraction may be performed on the video to be processed according to a set time interval to obtain N image frames. The set time interval may be set according to actual requirements, and the set time interval may be set to 1 second or 2 seconds and is not limited in the embodiments of the disclosure.

In the process of acquiring an image frame, the number N of image frames may be determined according to a quotient between a video duration and the set time interval. For example, the video duration is 60 seconds, the set time interval is 1 second, and the number N of the corresponding extracted image frames is 60.

In step 202, M image frames to be processed containing a target object are determined from the N image frames to obtain a candidate image set.

Here, after obtaining the N image frames, M image frames to be processed containing a target object may be determined from the N image frames based on an image recognition technology. In the embodiments of the disclosure, before determining an image frame to be processed from a video to be processed, frame extraction may be performed on the video to be processed to obtain N image frames, and then an image frame to be processed containing a target object is determined from the N image frames. Compared with image recognition of all the image frames in the video to be processed, the technical solution in the disclosure can reduce the workload of image processing, improve the speed and efficiency of image processing, and further improve the efficiency of determining a cover image.

In step 203, image frames, which are not matched with image frames to be filtered contained in a filtering rule, are extracted from the M image frames to be processed by performing matching based on the filtering rule according to a filtering model.

In step 204, the image frames which are extracted from the M image frames to be processed and are not matched with the image frames to be filtered contained in the filtering rule are input into a scoring network to obtain a target score of each image frame to be processed.

Here, the filtering model may be pre-trained based on a mathematical model for filtering each image frame. For example, the filtering model may be obtained based on neural network training. In the embodiments of the disclosure, the image content contained in an image frame to be processed may be matched with the image content of an image frame to be filtered, when the image frame to be processed contains the image content of a preset image frame to be filtered, the image frame to be processed is determined to be matched with the preset image frame to be filtered, and the image frame to be processed may be filtered out. The image content of the preset image frame to be filtered contained in the filtering rule may be junk image content containing preset junk words and/or junk pictures.

For example, in the process of implementation, the image content in an image frame to be processed may be matched with junk words and/or junk pictures contained in the junk image content, when the image frame to be processed contains the junk words and/or the junk pictures, the image frame to be processed is determined to be matched with a preset image frame to be filtered, and the image frame to be processed may be filtered out. In the disclosure, by filtering out the junk image content containing preset junk words and/or junk pictures, an image frame to be processed meeting conditions can be accurately determined, and the accuracy of the determined cover image is further improved.

Here, the image frame to be processed which is matched with the image frame to be filtered set based on the filtering rule may be filtered out through the filtering rule, and the image frame to be processed which is not matched with the image frame to be filtered set based on the filtering rule may be extracted. The image content contained in the image frame to be filtered set based on the filtering rule may be meaningless image content, for example, image content related to advertisements, pornography, affairs, violence, and/or terrorism, image content with a word ratio larger than an image ratio, etc.

In step 205, the target scores of the image frames to be processed are sequenced according to a set order, and a cover image of the video to be processed is determined from the M image frames to be processed according to a result of the sequencing.

In the embodiments of the disclosure, after the M target scores of the M image frames to be processed are obtained, the M target scores may be sequenced according to a descending sequence, and an image frame to be processed with the largest target score is determined as a cover image of the video to be processed.

In some embodiments, K image frames to be processed with the largest target score may also be determined as a cover image set of the video to be processed, i.e., a cover image set is generated based on top K image frames to be processed. In the process of implementation, each cover image in the cover image set may be displayed in the form of a slide based on a preset play time interval. Therefore, the diversification of the display mode of the cover image can be improved, and the use experience of users can be further improved.

In other embodiments, the M target scores may also be sequenced in an ascending sequence, which will not be specifically limited herein.

In the embodiments of the disclosure, M image frames to be processed are determined from a video to be processed, and a candidate image set is formed based on the M image frames to be processed. In the process of selecting a video cover, the M image frames to be processed can be scored based on a scoring network to obtain a target score of each of the image frames to be processed, the target scores are sequenced according to a set order, and then a cover image containing a target object is determined according to a result of the sequencing. Compared with the related art in which the cover image of the video to be processed is determined manually, automatic selection of the cover image can be realized. The selection accuracy of the video cover can be improved, and time consumed for determining the video cover can also be saved.

In some embodiments, after determining the cover image of the video to be processed, the cover image may be enhanced based on an image enhancement model to obtain an enhanced cover image, and the enhanced cover image is presented to a user. In the embodiments of the disclosure, the cover image may be enhanced by utilizing the image enhancement model, so that the resolution and definition of the finally displayed cover image can be improved.

Figure 3:
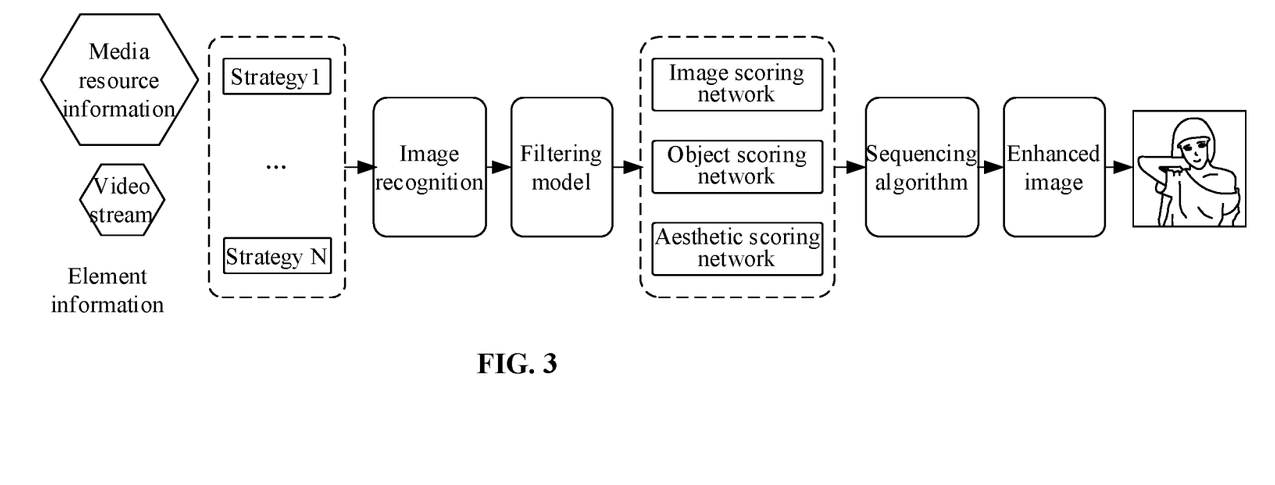
FIG. 3 is an overall framework diagram illustrating a video cover determining method according to at least one example of the disclosure.

FIG. 3 is an overall framework diagram illustrating a video cover determining method according to at least one example of the disclosure. As shown in FIG. 3, in the process of implementation, element information of a video to be processed may be input. The element information includes: media resource information and video streams of a video to be processed. For example, the video to be processed is a movie and television show, and the media resource information may be the leading actor information of the movie and television show.

After the element information of the video to be processed is input, the designated target object (e.g., actor C) may be selected as a selection basis of the cover image through a strategy center. Then, frame extraction is performed on the video to be processed according to a set time interval to obtain a plurality of image frames (e.g., to obtain N image frames).

After obtaining a plurality of image frames, image recognition is performed on the plurality of image frames, image frames to be processed containing a target object (e.g., M image frames to be processed containing actor C) are determined, and the image frames to be processed containing the target object are used as candidate cover images, and put into a candidate image queue (candidate image set).

Then, the image frames to be processed in the candidate image queue are filtered based on the filtering model, it is recognized whether an image frame to be processed contains the image content related to advertisements, pornography, affairs, violence, and/or terrorism, and if an image frame to be processed is recognized to contain the image content, the image frame to be processed is removed from the candidate image queue.

Then, all the filtered image frames to be processed in the candidate image queue are input into an image scoring network (physical scoring model) to obtain an image feature score of each of the image frames to be processed. All the filtered image frames to be processed in the candidate image queue are input into an object scoring network (human face scoring model) to obtain an object feature score of each of the image frames to be processed. All the filtered image frames to be processed in the candidate image queue are input into an aesthetic scoring network (aesthetic scoring model) to obtain an aesthetic feature score of each of the image frames to be processed.

After the image feature score, the object feature score and the aesthetic feature score of each image frame to be processed are obtained, the image feature score, the object feature score and the aesthetic feature score of each image frame to be processed may be weighted respectively, and the weighted image feature score, weighted object feature score and weighted aesthetic feature score may be summed to obtain the target score of each image frame to be processed.

After the target score of each image frame to be processed is obtained, each target score may be sequenced according to a descending sequence, and an image frame to be processed with the largest target score may be determined as a cover image of the video to be processed.

In other embodiments, after determining the cover image of the video to be processed, the cover image may be enhanced based on an image enhancement model to obtain an enhanced cover image, and the enhanced cover image is presented to a user. In the embodiments of the disclosure, the cover image may be determined by utilizing the image enhancement model, so that the resolution and definition of the finally displayed cover image can be improved.

Figure 4:
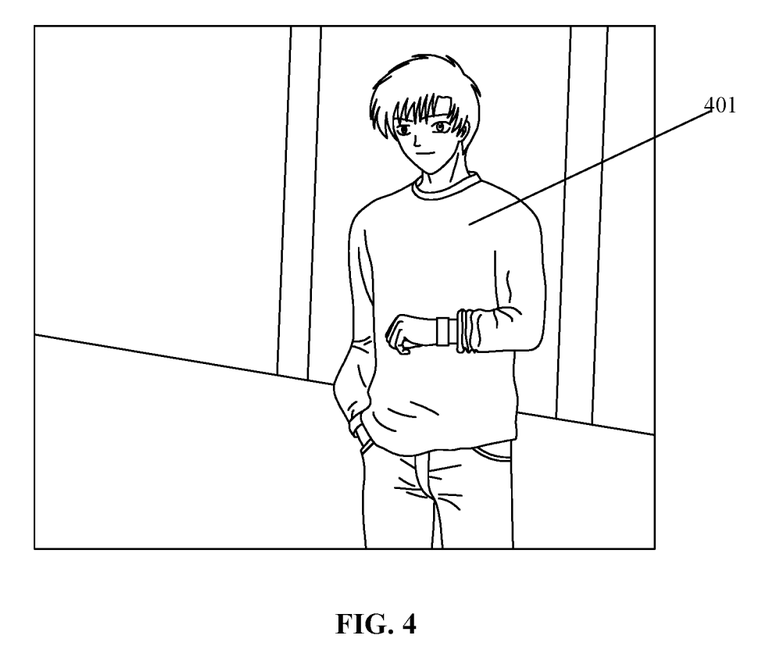
FIG. 4 is a schematic diagram illustrating a determined cover image according to at least one example of the disclosure.

FIG. 4 is a schematic diagram illustrating a determined cover image according to at least one example of the disclosure. As shown in FIG. 4, the determined cover image may include an image of a target object 401 (e.g., a leading actor in a movie and television show).

For example, the video to be processed is movie and television content. Through the technical solution of the embodiments of the disclosure, the problem of selecting a cover image of the movie and television content can be effectively solved, and the problem of poor original cover image of the movie and television content can be solved. In other embodiments, the original cover image of the video to be processed may also be placed in a candidate image queue to participate together in scoring.

Figure 5:
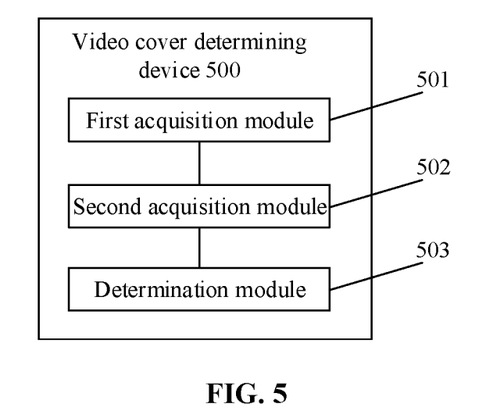
FIG. 5 is a first diagram illustrating a video cover determining device, according to at least one example of the disclosure.

FIG. 5 is a first diagram illustrating a video cover determining device, according to at least one example of the disclosure. As shown in FIG. 5, the video cover determining device 500 includes:

a first acquisition module 501, configured to obtain a candidate image set containing M image frames to be processed by determining the M image frames to be processed from a video to be processed, M being a positive integer;

a second acquisition module 502, configured to obtain a target score of each of the image frames to be processed by inputting the M image frames to be processed in the candidate image set into a scoring network; and a determination module 503, configured to sort the target scores of the image frames to be processed according to a set order, and determine a cover image of the video to be processed from the M image frames to be processed according to a result of the sequencing.

In some embodiments, the second acquisition module 502 is further configured to:
obtain an image feature score of each of the image frames to be processed by inputting the image frame to be processed into an image scoring network;
obtain an object feature score of each of the image frames to be processed by inputting the image frame to be processed into an object scoring network;
obtain an aesthetic feature score of each of the image frames to be processed by inputting the image frame to be processed into an aesthetic scoring network; and
obtain the target score of the image frames to be processed based on the image feature score, the object feature score and the aesthetic feature score.

In some embodiments, the second acquisition module 502 is further configured to:
weight the image feature score, the object feature score and the aesthetic feature score of each of the image frames to be processed, respectively; and
obtain the target score of the image frames to be processed by summing the weighted image feature score, weighted object feature score and weighted aesthetic feature score.

In some embodiments, the device 500 further includes:
a processing module, configured to perform frame extraction on the video to be processed according to a set time interval to obtain N image frames.

The first acquisition module is further configured to:
determine the M image frames to be processed containing the target object from the N image frames, each of the image frames to be processed containing at least one target object, N being a positive integer greater than or equal to M.

In some embodiments, the device 500 further includes:
a filtering module, configured to extract image frames, which are not matched with image frames to be filtered contained in a filtering rule, from the M image frames to be processed by performing matching based on the filtering rule according to a filtering model.

The second acquisition module is further configured to:
input the image frames which are extracted from the M image frames to be processed and are not matched with the image frames to be filtered contained in the filtering rule into the scoring network to obtain the target score of each of the image frames to be processed.

Regarding the device in the above embodiment, the specific manner in which each module performs operations has been described in detail in the embodiment about the method, and detailed descriptions are omitted herein.

Figure 6:
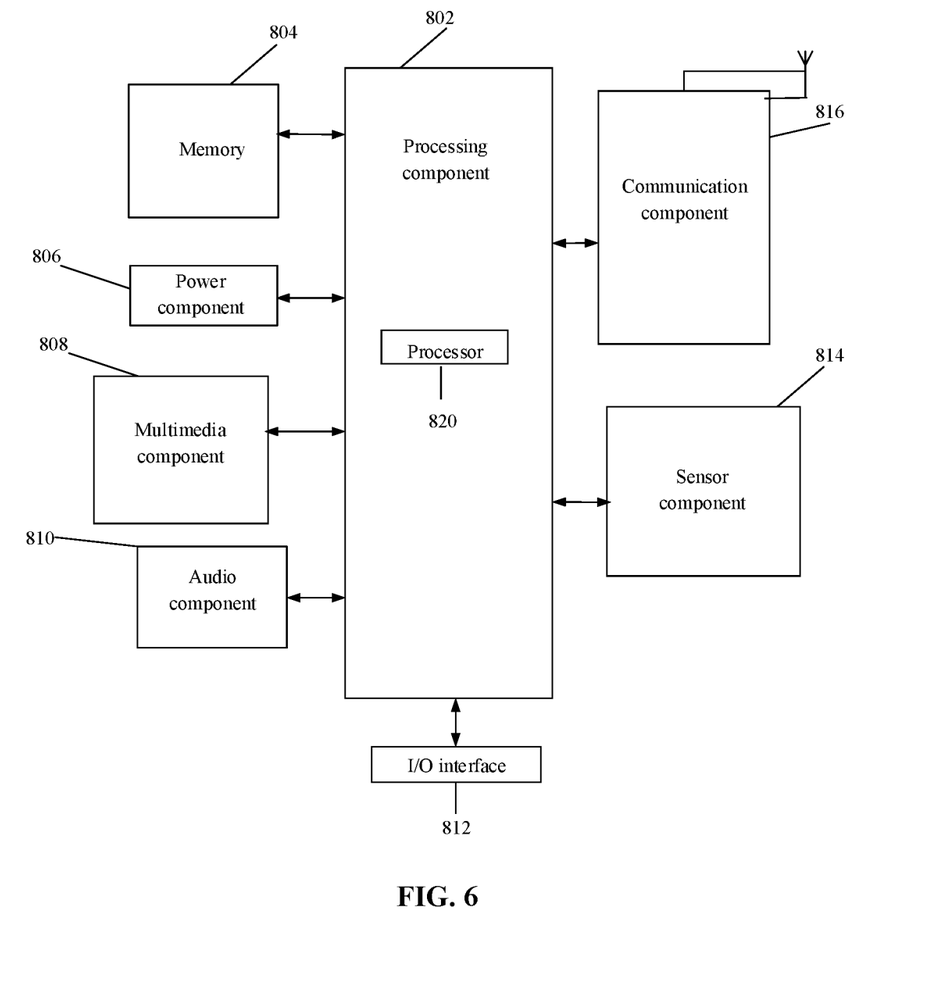
FIG. 6 is a second diagram illustrating a video cover determining device, according to at least one example of the disclosure.

FIG. 6 is a second diagram illustrating a video cover determining device, according to at least one example of the disclosure. For example, the device may be a mobile phone, a mobile computer, etc.

Referring to FIG. 6, the device may include one or more of the following components: a processing component 802, a memory 804, a power component 806, a multimedia component 808, an audio component 810, an Input/Output (I/O) interface 812, a sensor component 814, and a communication component 816.

The processing component 802 typically controls overall operations of the device, such as operations associated with display, telephone calls, data communications, camera operations, and recording operations. The processing component 802 may include one or more processors 820 for executing instructions to complete all or part of the steps in the described methods. In addition, the processing component 802 may include one or more modules to facilitate interaction between the processing component 802 and other components. For example, the processing component 802 may include a multimedia module to facilitate the interaction between the multimedia component 808 and the processing component 802.

The memory 804 is configured to store various types of data to support operations at the device. Examples of such data include instructions for any applications or methods operated on the device, contact data, phone book data, messages, pictures, videos, etc. The memory 804 may be implemented using any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 806 provides power to various components of the device. The power component 806 may include a power management system, one or more power sources, and any other components associated with the generation, management, and distribution of power for the device.

The multimedia component 808 includes a screen providing an output interface between the device and a user. In some embodiments, the screen may include a Liquid Crystal Display (LCD) and a Touch Panel (TP). If the screen includes the TP, the screen may be implemented as a touch screen to receive input signals from the user. The TP includes one or more touch sensors to sense touches, swipes and gestures on the TP. The touch sensors may not only sense a boundary of a touch or swipe action, but also sense a period of time and a pressure associated with the touch or swipe action. In some embodiments, the multimedia component 808 includes a front camera and/or a rear camera. The front camera and/or the rear camera may receive external multimedia data while the device is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a Microphone (MIC) configured to receive an external audio signal when the device is in an operation mode, such as a call mode, a recording mode, and a voice recognition mode. The received audio signal may be further stored in the memory 804 or transmitted via the communication component 816. In some embodiments, the audio component 810 further includes a speaker for outputting audio signals.

The I/O interface 812 provides an interface between the processing component 802 and peripheral interface modules, such as a keyboard, a click wheel, or buttons. The buttons may include, but are not limited to, a home button, a volume button, a starting button, and a locking button.

The sensor component 814 includes one or more sensors to provide status assessments of various aspects of the device. For example, the sensor component 814 may detect an open/closed status of the device, and relative positioning of components. For example, the component is the display and the keypad of the device. The sensor component 814 may also detect a change in position of the device or a component of the device, a presence or absence of user contact with the device, an orientation or an acceleration/deceleration of the device, and a change in temperature of the device. The sensor component 814 may include a proximity sensor configured to detect the presence of nearby objects without any physical contact. The sensor component 814 may also include a light sensor, such as a Complementary Metal Oxide Semiconductor (CMOS) or Charge Coupled Device (CCD) image sensor, for use in imaging applications. In some embodiments, the sensor component 814 may also include an acceleration sensor, a gyroscope sensor, a magnetic sensor, a pressure sensor, or a temperature sensor.

The communication component 816 is configured to facilitate communication, wired or wirelessly, between the device and other devices. The device may access a wireless network based on a communication standard, such as Wi-Fi, 2G or 3G, or a combination thereof. In at least some embodiments, the communication component 816 receives a broadcast signal or broadcast associated information from an external broadcast management system via a broadcast channel. In at least some embodiments, the communication component 816 further includes a Near Field Communication (NFC) module to facilitate short-range communications. For example, the NFC module may be implemented based on a Radio Frequency Identification (RFID) technology, an Infrared Data Association (IrDA) technology, an Ultra-Wideband (UWB) technology, a Bluetooth (BT) technology, and other technologies.

In at least some embodiments, the device may be implemented with one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, for performing the above methods.

In at least some embodiments, there is also provided a non-transitory computer-readable storage medium including instructions, such as a memory 804 including instructions executable by the processor 820 of the device, for performing the above method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

A non-transitory computer-readable storage medium is provided. When instructions in the storage medium are executed by a processor of a terminal device, the terminal device is enabled to perform a video cover determining method. The method includes:

obtaining a candidate image set containing M image frames to be processed by determining the M image frames to be processed from a video to be processed, each of the image frames to be processed containing at least one target object, M being a positive integer;

obtaining a target score of each of the image frames to be processed by inputting the M image frames to be processed in the candidate image set into a scoring network; and sorting the target scores of the image frames to be processed according to a set order, and determining a cover image of the video to be processed from the M image frames to be processed according to a result of the sorting.

The technical solutions provided by the embodiments of the disclosure may include the following beneficial effects.

In the embodiments of the disclosure, M image frames to be processed are determined from a video to be processed, and a candidate image set is formed based on the M image frames to be processed. In the process of selecting a video cover, the M image frames to be processed can be scored based on a scoring network to obtain a target score of each of the image frames to be processed, the target scores are sequenced according to a set order, and then a cover image containing a target object is determined according to a result of the sequencing. Compared with the related art in which the cover image of the video to be processed is determined manually, automatic selection of the cover image can be realized. The selection accuracy of the video cover can be improved, and time consumed for determining the video cover can also be saved.

Other embodiments of the disclosure will be apparent to those skilled in the art from consideration of the specification and practice of the disclosure disclosed here. The disclosure is intended to cover any variations, uses, or adaptations of the disclosure following the general principles thereof and including such departures from the disclosure as come within known or customary practice in the art. It is intended that the specification and examples be considered as explanatory only, with a true scope and spirit of the disclosure being indicated by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for determining a video cover image, comprising:

obtaining a candidate image set containing a plurality of image frames to be processed by determining the plurality of image frames to be processed from a video to be processed, each of the plurality of image frames to be processed containing at least one target object;

inputting each of the plurality of image frames to be processed into an image scoring network to obtain a black edge size of each of the plurality of image frames to be processed, a brightness score of each of the plurality of image frames to be processed, and a definition score of each of the plurality of image frames to be processed, wherein the image scoring network is obtained based on neural network training;

weighting the black edge size of each of the plurality of image frames to be processed, the brightness score of each of the plurality of image frames to be processed, and the definition score of each of the plurality of image frames to be processed;

summing the weighted black edge size of a picture where each of the plurality of image frames to be processed is located, the weighted brightness score of each of the plurality of image frames to be processed, and the weighted definition score of each of the plurality of image frames to be processed to obtain an image feature score of each of the plurality of image frames to be processed, wherein image features of an image frame to be processed comprise: a black edge, a brightness, and a definition, and the black edge is a black part except picture content in the image frame to be processed;

inputting each of the plurality of image frames to be processed into an object scoring network to obtain a number of person images in each of the plurality of image frames to be processed, a location of a person image in the image frame to be processed, a size of the person image, a definition score of the person image, an eye state score of a person in the person image, an expression score of the person in the person image, and a pose score of the person in the person image, wherein the object scoring network is obtained based on neural network training;

obtaining an object feature score of each of the plurality of image frames to be processed based on the number of the person images in each of the plurality of image frames to be processed, the location of the person image in the image frame to be processed, the size of the person image, the definition score of the person image, the eye state score of the person in the person image, the expression score of the person in the person image, and the pose score of the person in the person image;

inputting each of the plurality of image frames to be processed into an aesthetic scoring network to obtain a composition score of each of the image frames to be processed and a color richness score of each of the plurality of image frames to be processed, wherein the aesthetic scoring network is obtained based on neural network training;

obtaining an aesthetic feature score of each of the plurality of image frames to be processed based on the composition score of each of the plurality of image frames to be processed and the color richness score of each of the plurality of image frames to be processed;

obtaining the target score of each of the plurality of image frames to be processed based on the image feature score, the object feature score, and the aesthetic feature score; and sorting a plurality of target scores of the plurality of image frames to be processed according to a set order to obtain a sorting result, and determining the video cover image of the video to be processed from the plurality of image frames to be processed according to the sorting result.

2. The method of claim 1, wherein obtaining the target score of each of the plurality of image frames to be processed based on the image feature score, the object feature score, and the aesthetic feature score comprises:

obtaining a weighted image feature score, a weighted object feature score, and a weighted aesthetic feature score by respectively weighting the image feature score, the object feature score, and the aesthetic feature score of each of the plurality of image frames to be processed; and obtaining the target score of each of the plurality of image frames to be processed by summing the weighted image feature score, the weighted object feature score, and the weighted aesthetic feature score.

3. The method of claim 1, wherein a number of the plurality of image frames is M, M being a positive integer; and wherein the method further comprises:

obtaining N image frames by performing frame extraction on the video to be processed according to a set time interval, wherein determining the plurality of image frames to be processed from the video to be processed comprises:

determining the plurality of image frames to be processed containing the target object from the N image frames, N being a positive integer greater than or equal to M.

4. The method of claim 1, further comprising:

extracting one or more image frames from the plurality of image frames to be processed by performing matching based on a filtering rule according to a filtering model, wherein the one or more image frames extracted are not matched with image frames to be filtered contained in the filtering rule, and wherein obtaining the target score of each of the plurality of image frames to be processed by inputting the plurality of image frames to be processed in the candidate image set into the scoring network comprises:

obtaining the target score of each of the one or more image frames that are not matched with the image frames to be filtered contained in the filtering rule and extracted from the plurality of image frames to be processed by inputting the image frame into the scoring network.

5. A device, comprising:

a processor; and a memory configured to store instructions executable by the processor, wherein the processor is configured to execute the instructions to:

obtain a candidate image set containing a plurality of image frames to be processed by determining the plurality of image frames to be processed from a video to be processed, each of the plurality of image frames to be processed containing at least one target object;

input each of the plurality of image frames to be processed into an image scoring network to obtain a black edge size of each of the plurality of image frames to be processed, a brightness score of each of the plurality of image frames to be processed, and a definition score of each of the plurality of image frames to be processed, wherein the image scoring network is obtained based on neural network training;

weight the black edge size of each of the plurality of image frames to be processed, the brightness score of each of the plurality of image frames to be processed, and the definition score of each of the plurality of image frames to be processed;

sum the weighted black edge size of a picture where each of the plurality of image frames to be processed is located, the weighted brightness score of each of the plurality of image frames to be processed, and the weighted definition score of each of the plurality of image frames to be processed to obtain an image feature score of each of the plurality of image frames to be processed, wherein image features of an image frame to be processed comprise: a black edge, a brightness, and a definition, and the black edge is a black part except picture content in the image frame to be processed;

input each of the plurality of image frames to be processed into an object scoring network to obtain a number of person images in each of the plurality of image frames to be processed, a location of a person image in the image frame to be processed, a size of the person image, a definition score of the person image, an eye state score of a person in the person image, an expression score of the person in the person image, and a pose score of the person in the person image, wherein the object scoring network is obtained based on neural network training;

obtain an object feature score of each of the plurality of image frames to be processed based on the number of the person images in each of the plurality of image frames to be processed, the location of the person image in the image frame to be processed, the size of the person image, the definition score of the person image, the eye state score of the person in the person image, the expression score of the person in the person image, and the pose score of the person in the person image;

input each of the plurality of image frames to be processed into an aesthetic scoring network to obtain a composition score of each of the image frames to be processed and a color richness score of each of the plurality of image frames to be processed, wherein the aesthetic scoring network is obtained based on neural network training;

obtain an aesthetic feature score of each of the plurality of image frames to be processed based on the composition score of each of the plurality of image frames to be processed and the color richness score of each of the plurality of image frames to be processed;

obtain the target score of each of the plurality of image frames to be processed based on the image feature score, the object feature score, and the aesthetic feature score; and sort a plurality of target scores of the plurality of image frames to be processed according to a set order to obtain a sorting result, and determine a video cover image of the video to be processed from the plurality of image frames to be processed according to the sorting result.

6. The device of claim 5, wherein the processor is further configured to execute the instructions to:
respectively weight the image feature score, the object feature score, and the aesthetic feature score of each of the plurality of image frames to be processed; and
obtain the target score of each of the plurality of image frames to be processed by summing the weighted image feature score, the weighted object feature score, and the weighted aesthetic feature score.

7. The device of claim 5, wherein a number of the plurality of image frames is M, M being a positive integer; and
wherein the processor is further configured to execute the instructions to:
perform frame extraction on the video to be processed according to a set time interval to obtain N image frames; and
determine the plurality of image frames to be processed containing the target object from the N image frames, N being a positive integer greater than or equal to M.

8. The device of claim 7, wherein the processor is further configured to execute the instructions to:
extract one or more image frames from the plurality of image frames to be processed by performing matching based on a filtering rule according to a filtering model, wherein the one or more image frames extracted are not matched with image frames to be filtered contained in the filtering rule,; and
obtain the target score of each of the one or more image frames that are not matched with the image frames to be filtered contained in the filtering rule and extracted from the plurality of image frames to be processed by inputting the image frame into the scoring network.

9. A non-transitory computer-readable storage medium, wherein when instructions in the storage medium are executed by a processor of a device, cause the device to perform acts comprising:
obtaining a candidate image set containing a plurality of image frames to be processed by determining the plurality of image frames to be processed from a video to be processed, each of the plurality of image frames to be processed containing at least one target object;
inputting each of the plurality of image frames to be processed into an image scoring network to obtain a black edge size of each of the plurality of image frames to be processed, a brightness score of each of the plurality of image frames to be processed, and a definition score of each of the plurality of image frames to be processed, wherein the image scoring network is obtained based on neural network training;
weighting the black edge size of each of the plurality of image frames to be processed, the brightness score of each of the plurality of image frames to be processed, and the definition score of each of the plurality of image frames to be processed;
summing the weighted black edge size of a picture where each of the plurality of image frames to be processed is located, the weighted brightness score of each of the plurality of image frames to be processed, and the weighted definition score of each of the plurality of image frames to be processed to obtain an image feature score of each of the plurality of image frames to be processed, wherein image features of an image frame to be processed comprise: a black edge, a brightness, and a definition, and the black edge is a black part except picture content in the image frame to be processed;
inputting each of the plurality of image frames to be processed into an object scoring network to obtain a number of person images in each of the plurality of image frames to be processed, a location of a person image in the image frame to be processed, a size of the person image, a definition score of the person image, an eye state score of a person in the person image, an expression score of the person in the person image, and a pose score of the person in the person image, wherein the object scoring network is obtained based on neural network training;
obtaining an object feature score of each of the plurality of image frames to be processed based on the number of the person images in each of the plurality of image frames to be processed, the location of the person image in the image frame to be processed, the size of the person image. the definition score of the person image, the eye state score of the person in the person image, the expression score of the person in the person image, and the pose score of the person in the person image;
inputting each of the plurality of image frames to be processed into an aesthetic scoring network to obtain a composition score of each of the image frames to be processed and a color richness score of each of the plurality of image frames to be processed, wherein the aesthetic scoring network is obtained based on neural network training;
obtaining an aesthetic feature score of each of the plurality of image frames to be processed based on the composition score of each of the plurality of image frames to be processed and the color richness score of each of the plurality of image frames to be processed;
obtaining the target score of each of the plurality of image frames to be processed based on the image feature score, the object feature score, and the aesthetic feature score; and
sorting a plurality of target scores of the plurality of image frames to be processed according to a set order to obtain a sorting result, and determining a video cover image of the video to be processed from the plurality of image frames to be processed according to the sorting result.

10. The storage medium of claim 9, wherein obtaining the target score of each of the plurality of image frames to be processed based on the image feature score, the object feature score, and the aesthetic feature score comprises:
obtaining a weighted image feature score, a weighted object feature score, and a weighted aesthetic feature score by respectively weighting the image feature score, the object feature score, and the aesthetic feature score of each of the plurality of image frames to be processed; and
obtaining the target score of each of the plurality of image frames to be processed by summing the weighted image feature score, the weighted object feature score, and the weighted aesthetic feature score.

11. The storage medium of claim 9, wherein a number of the plurality of image frames is M, M being a positive integer; and
wherein the instructions cause the device to perform acts further comprising:

obtaining N image frames by performing frame extraction on the video to be processed according to a set time interval, wherein determining the plurality of image frames to be processed from the video to be processed comprises:

determining the plurality of image frames to be processed containing the target object from the N image frames, N being a positive integer greater than or equal to M.

12. The storage medium of claim 9, wherein the instructions cause the device to perform acts further comprising:

extracting one or more image frames from the plurality of image frames to be processed by performing matching based on a filtering rule according to a filtering model, wherein the one or more image frames extracted are not matched with image frames to be filtered contained in the filtering rule, wherein obtaining the target score of each of the plurality of image frames to be processed by inputting the plurality of image frames to be processed in the candidate image set into the scoring network comprises:

obtaining the target score of each of the one or more image frames that are not matched with the image frames to be filtered contained in a filtering rule and extracted from the plurality of image frames to be processed by inputting the image frame into the scoring network.

* * * * *